United States Patent

[11] 3,559,765

| [72] | Inventor | Roy B. Smith |
| | | Washington Court House, Ohio |
| [21] | Appl. No. | 714,895 |
| [22] | Filed | Mar. 21, 1968 |
| [45] | Patented | Feb. 2, 1971 |
| [73] | Assignee | Transportation Specialists, Inc. |
| | | Columbus, Ohio |
| | | a corporation of Ohio |

[54] LUBRICATION METER VALVE
2 Claims, 12 Drawing Figs.

[52] U.S. Cl. ............................................ 184/7,
184/29
[51] Int. Cl. ........................................ F16n 27/00
[50] Field of Search........................... 184/7(C1),
29; 137/(Inquired); 251/(Inquired); 222/335;
103/52, 44W; 184/7(C2)

[56] References Cited
UNITED STATES PATENTS

| 1,837,811 | 12/1931 | Farmer.................... | 184/7 |
| 1,870,188 | 8/1932 | Abrams.................... | 222/335 |
| 2,204,878 | 6/1940 | Anderson.................. | 184/7 |
| 2,232,620 | 2/1949 | Meeks...................... | 184/7 |
| 2,478,260 | 8/1949 | Fioretti..................... | 222/335X |

FOREIGN PATENTS

| 1,138,952 | 10/1962 | Germany................... | 184/29 |
| 215,828 | 6/1958 | Great Britain............. | 103/52 |

*Primary Examiner*—Manuel A. Antonakas
*Attorney*—Jerome R. Cox

ABSTRACT: A meter valve is described comprising a cylindrical body with a central bore drilled from one end having a cooperating sealingly slidable spring-biased piston therein and having a ball check valve permitting one-way communication between the bore and the end of the body opposite the open or inlet end. The bore has a circular groove in it. The piston is slidable to alternatively block communication (1) between the groove and the inlet end of the bore, and (2) between the groove and the ball check valve. Movement of the piston away from the ball check valve creates a substantial vacuum which is used to boil lubricant out of the groove and eventually force it out through the check valve.

INVENTOR.
ROY B SMITH
BY
Jerome R. Cox
ATTORNEY

INVENTOR.
ROY B. SMITH
BY
Jerome R. Cox
ATTORNEY

INVENTOR.
ROY B. SMITH

LUBRICATION METER VALVE

BACKGROUND OF THE INVENTION

My invention relates to lubrication apparatus, and more particularly relates to devices for assuring a reliable and properly metered supply of lubricant to bearings and other devices requiring lubrication.

The supply of lubricant to a vital part of a machine involves basically the movement of a metered quantity of lubricant from one compartment of a meter valve to another.

A very simple system is shown in FIG. 1. Lubricant is supplied from a reservoir 10 to a bearing 12 by merely operating a valve 14 positioned between conduits 16 and 18 which are connected respectively to the bearing 12 and the reservoir 10. If the reservoir 10 is pressurized, opening of the valve 14 permits the supply of lubricant to the bearing 12. In so doing, lubricant in conduit 18 is replaced by lubricant from the reservoir 10, and lubricant in the conduit 16 is replaced by lubricant from the conduit 18. Because such a system does not accurately apply a measured quantity of lubricant to the bearing, it is not used. It does, however, illustrate one of the basic principles which serve to distinguish my invention from the many devices already well known. When lubricant is moved from a first compartment to a second compartment, such as from conduit 18 to conduit 16, something must refill the space or volume formerly occupied by the lubricant evacuated from the first compartment. Thus, in the device shown in FIG. 1, lubricant evacuating the conduit 16 is replaced by lubricant from conduit 18.

In FIG. 2, I illustrate a system which represents a commonly used type of lubricant metering device. It is a piston displacement system in which a piston 20 cooperates with a cylinder 22 and two check valves 24 and 26 to function as a pump for supplying lubricant from a reservoir 30 to a bearing 32. The piston is mechanically reciprocated and the quantity of lubricant discharged is determined by the piston displacement of a stroke.

In some other devices of this piston displacement type, the piston strokes are accomplished alternately by lubricant pressure applied at the reservoir and by an opposing spring force. The piston is mechanically connected to operate valves controlling lubricant input to and output from the piston. Such devices are shown by Klein in U.S. Pat. No. 2,358,719 and by Pierce et al. in U.S. Pat. No. 1,786,548 and by many others. All the piston displacement systems are characterized by the fact that lubricant is drawn into a compartment having a variable volume by increasing the volume of the compartment and simultaneously opening a connection to the reservoir. Lubricant is removed from the compartment by decreasing the compartment volume and forcing the lubricant therefrom. Space formerly occupied by lubricant in the compartment becomes occupied by the piston. The piston replaces the lubricant which moves toward the machine part being lubricated.

Both the simple valve system and the piston displacement system will supply machine parts with either fluid lubricants such as oil, or nonfluid lubricants such as grease. I use the term "nonfluid lubricant" to indicate those lubricating materials which do not substantially flow in response to gravitational or similar forces. Among these nonfluid lubricating materials are the well known lubricants comprising liquid or solid lubricants mixed with a vehicle or carrier. Furthermore, even common oil becomes nonfluid at a sufficiently low temperature.

Because the piston displacement systems require not only several moving parts but also the synchronization and cooperation of these parts and are therefore expensive to manufacture, operate, and maintain, some inventors have provided more simple devices such as those shown by Moore, U.S. Pat. No. 1,821,314; Wulf, U.S. Pat. No. 1,761,699; and especially by Farmer, U.S. Pat. No. 1,837,811. These devices have the disadvantage that they operate only with fluid lubricants because they depend upon the gravity flow of the lubricant to move the lubricant from one compartment to another.

A simplified diagram of such a system is shown in FIG. 3. A reservoir 40 supplies lubricant to the top of a cylinder 36 in which a piston 38 reciprocates. A groove 44 is formed around the inside of the cylinder wall. The bearing 42 is fed from the lower part of the cylinder.

Pressure on the lubricant is applied at the reservoir 40 which forces the piston downward compressing the spring 46 and eventually permitting oil to flow into and fill the groove 44.

The fluid pressure at the reservoir is then withdrawn and the spring forces the piston upwardly until the oil may flow by gravity to the lower portion of the cylinder 36 and eventually to the bearing 42.

When the lubricant leaves the groove 44 by gravity, it is replaced by air from the cylinder 36 and from the cavity 48 in the lower part of the piston 38.

Heretofore it was well known to those skilled in the art that the presence of a substantial vacuum in the lower portion of the cylinder impeded the operation of the gravity flow system. The above referred to patent to Farmer emphasizes this fact and provides an air pocket or cavity in the bottom of his piston to eliminate such a vacuum.

While the piston displacement systems function well for fluid and nonfluid lubricants, there is a need for a device with fewer moving parts, less complicated structure, and which is therefore more reliable and far less expensive to manufacture and maintain.

While the gravity feed devices offer simplicity, they must be used in a vertical position to permit the proper gravitational flow of lubricant, and therefore there is a need for a lubricating device which will operate in any position of alignment. Furthermore, there is a need for a device having the described simplicity which will operate with nonfluid lubricants.

It is therefore an object of my invention to provide an improved lubrication metering device.

Another object of my invention is to provide a metering valve which is not only mechanically simple, inexpensive and reliable, but which also will function with nonfluid lubricants.

Another object of my invention is to provide a metering valve which does not depend upon the existence or orientation of gravitational forces.

Another object of my invention is to provide a metering valve which can function in any position or orientation.

Another object of my invention is to provide an improved metering device which enhances the flow of fluid lubricants.

A still further object of my invention is to provide a novel method for moving lubricants from one compartment of a metering valve to another.

Further objects and features of my invention will be apparent from the following specification and claims when considered in connection with the accompanying drawings illustrating several embodiments of my invention.

SUMMARY OF THE INVENTION

I have found that the foregoing and other objects may be attained by boiling the lubricant out of a compartment in a meter valve by reducing the pressure on the lubricant in the compartment.

I have also found that the foregoing and other objects may be attained with a metering unit comprising: a body having an enclosed compartment with a fixed volume, an inlet passage at times communicating with the compartment and an outlet passage at times communicating with the compartment; means for alternatively blocking the inlet passage and the outlet passage; means for forcing a material into the compartment when the outlet passage is blocked; and means for substantially decreasing the pressure in the compartment when the inlet passage is blocked.

More particularly, these objects may be attained in a metering valve comprising a piston; a body, having a bore therein, having a compartment with a fixed volume communicating with the bore, having an inlet at times communicating with the bore, having an outlet at times communicating with the bore, and having the piston sealingly slidable in said bore, the piston being alternatively positionable (1) to block communication of the compartment with the inlet while permitting communication of the compartment with the outlet, and (2) to block communication of the compartment with the outlet while permitting communication of the compartment with the inlet; valve means for selectively blocking said outlet; and a resilient means for forcing the piston away from the outlet.

Figure 1:
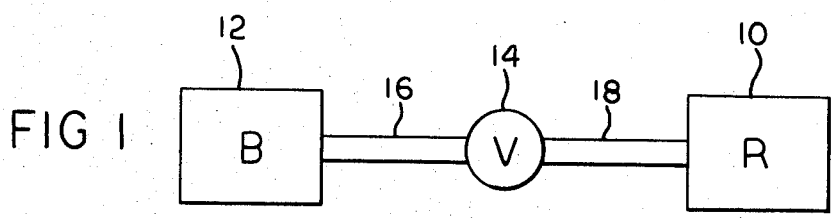
FIG. 1 is a diagrammatical view of a prior art lubricating system.
Figure 2:
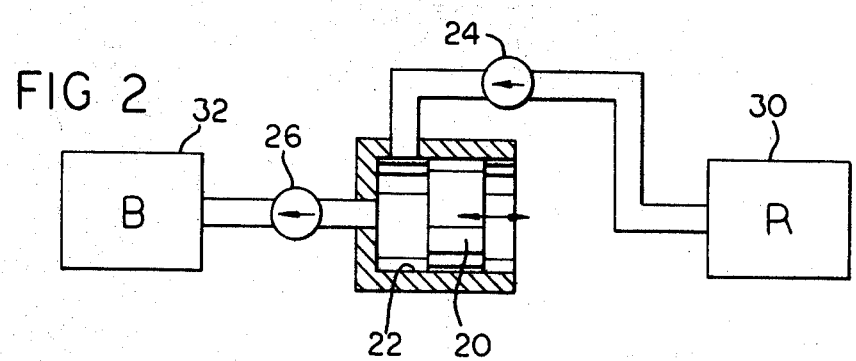
FIG. 2 is a diagrammatic view of a prior art piston displacement lubricating system.
Figure 3:
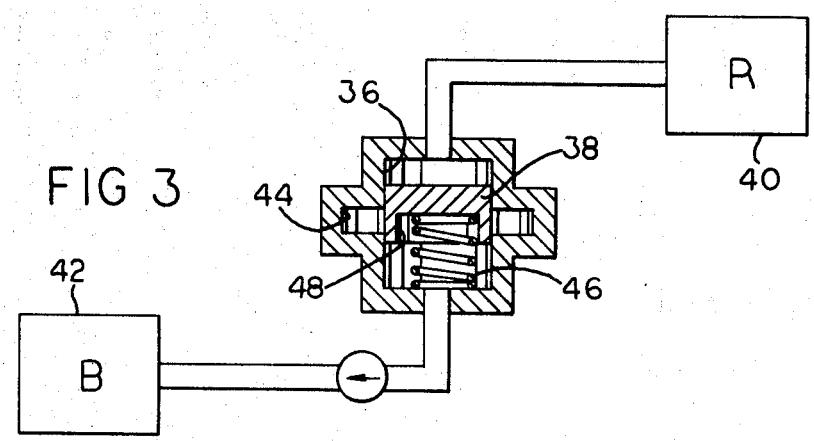
FIG. 3 is a diagrammatic view of a prior art gravity flow lubricating system.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DESCRIPTION OF THE PREFERRED EMBODIMENTS

FIGS. 4, 5, 6, and 7 illustrate the preferred embodiment of my invention. This embodiment has a cylindrical body 50 with internal threads 52 at one end for fluid connection to a lubricant supply reservoir and with external threads 54 at the opposite end for fluid connection to the machine part being lubricated.

A bore 56 extends coaxially into the body 50. A ball check valve, indicated generally by 58, communicates with an outlet end 60 of the bore 56 and the externally threaded outside end of the body 50. The check valve 58 comprises a ball 62 and a ball retaining ring 64 and permits lubricant flow only away from the bore 56.

A cylindrical piston 66 is sealingly slidable within the bore 56. A plunger 68 extends from the end of the piston 66 nearest the outlet end 60 of the bore 56. The plunger 68 has a tapered end 70 which is tapered to seat in the tapered valve seat 72 and thereby block flow of lubricant through the check valve 58. I do not consider the plunger to be a part of the piston, especially since use of the plunger is optional as explained below.

A helical spring 74 is longitudinally positioned in the bore 56 to bias the piston by applying a force on the piston 66 which tends to move it away from the outlet end 60 of the bore 56.

A circular groove 76 is cut around the bore 56 near its inlet end 80 and has a resilient circular O-ring 78 positioned in it. Contact of the piston 66 with the O-ring 78 prevents lubricant leakage past the circle of contact. A circular groove compartment 82 is cut around the bore 56 into which lubricant is forced as I will now explain with the operation of the preferred embodiment.

OPERATION

Figure 4:
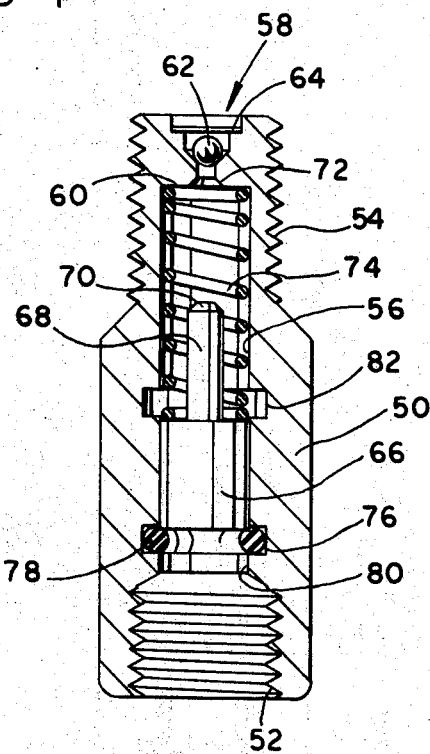
FIG. 4 is a view in vertical section of the preferred embodiment of a meter valve constructed according to my invention, with the piston in the position it assumes when no pressure is applied on the lubricant.
Figure 5:
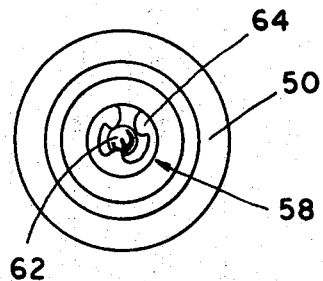
FIG. 5 is a top view of the meter valve shown in FIG. 6.

Operation of my device begins with the piston 66 in the position it assumes (as in FIG. 4) when there is no pressure applied on the lubricant at the reservoir. The absence of lubricant fluid at the inlet end 80 of the bore 56 permits the spring 74 to force the piston 66 against the O-ring 78 as shown in FIG. 4. In this position, the piston 66 blocks communication between the inlet end 80 and the groove compartment 82 while permitting communication between the groove compartment 82 and the outlet end 60.

Application of pressure on the lubricant forces the piston 66 toward the outlet end 60. When communication between the groove compartment 82 and the inlet end 80 is unblocked, lubricant under pressure is forced into and fills the groove compartment 82.

Figure 6:
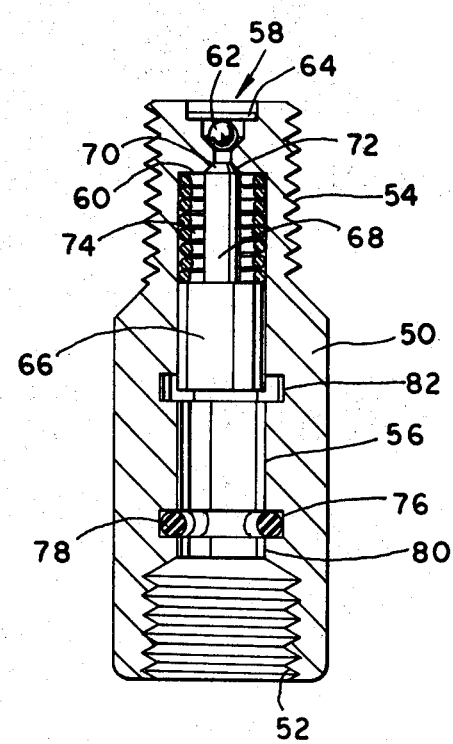
FIG. 6 is a view in vertical section of the meter valve shown in FIG. 4 with the piston in the extreme position it assumes while the pressure is applied on the lubricant supply.

Piston motion toward the outlet end 60 is halted when the tapered end 70 of the plunger 68 seats against the valve seat 72 as shown in FIG. 6 to prevent any leakage of lubricant through the check valve 58. In this position, communication of the groove compartment 82 with the outlet end 60 is blocked while communication with the inlet end is permitted.

My device remains in the position of FIG. 6 until pressure on the lubricant at the reservoir is no longer applied. It is then that the extraordinary features of my invention begin to operate. The spring may then force the piston away from the outlet end 60, creating a substantial vacuum in the bore 56 at the outlet end 60 of the bore which causes the ball 62 to seal the check valve.

Figure 7:
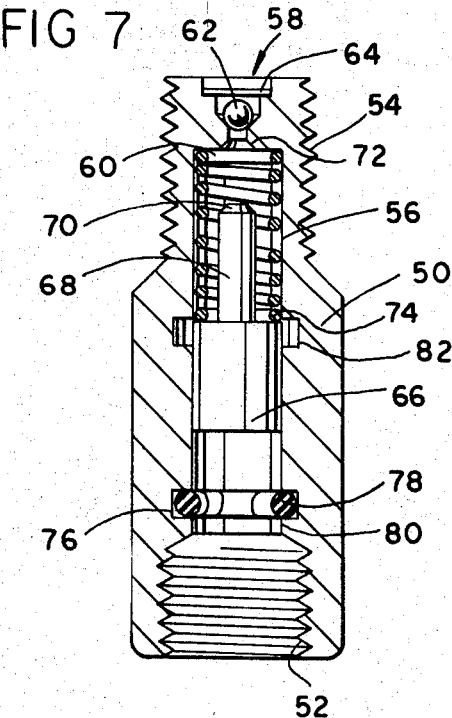
FIG. 7 is a view in vertical section of the meter valve shown in FIG. 4 with the piston in the position which initially permits boiling of the lubricant out of the groove compartment.

At the instant that the piston 66 unblocks communication between the groove compartment 82 and the outlet end 60, as illustrated in FIG. 7, and while communication with the inlet end 80 is blocked, a major portion of the lubricant in the groove compartment 82 boils out of the groove compartment and into the bore 56. The use of boiling, explained in more detail below, to move the lubricant out of the groove compartment is one of the novel accomplishments of my invention and is independent of the direction of or existence of a gravitational force. During the succeeding cycles of operation, the piston moves all lubricant boiled out of the groove compartment 82 toward the outlet end 60.

Eventually, after a few cycles of operation, the bore between the piston 66 and the outlet end 60 fills entirely with lubricant to a volume equal to the volume shown between the piston 66 and the outlet end 60 in FIG. 6.

Subsequently, during each cycle, an amount of lubricant will be expelled from the check valve 58 equal to the amount boiled out of the groove compartment 82 during that cycle. Only this specific amount is expelled, regardless of the length of time pressure is applied to the lubricant at the reservoir and regardless of the magnitude of that pressure.

While the phenomenon of lubricant boiling due to sufficient pressure reduction is known, use of this phenomenon to move a lubricant from one compartment of a meter valve to another has never, to my knowledge, been attempted.

Others have reduced the pressure on a compartment and then opened a valve connected to a supply to permit lubricant to be drawn out of the compartment while permitting other lubricant to be drawn into the compartment. An important advantage of my invention is that there is no need for providing such a valve or for providing mechanism to open it at the proper instant.

When lubricant is withdrawn from the groove compartment 82 of my device, it is not replaced immediately by lubricant coming into the compartment from a reservoir. With the boiling of the lubricant, the space evacuated by outgoing lubricant becomes filled with lubricant vapor in the form of small bubbles forming throughout the lubricant when the pressure on it is reduced.

Thus with my invention, nonfluid lubricants may be moved out of a compartment without the complexity of additional valves. Furthermore, this boiling phenomenon occurs regardless of the alignment of my device or the presence of gravity, and therefore not only will a device made according to my invention operate with nonfluid lubricants but also it will provide enhanced operation with fluid lubricants.

For example, if the device shown by Farmer in the above cited patent were modified according to my discovery and in a manner contrary to its teachings so that a substantial vacuum were created, it would operate in a completely different mode (i.e. boiling instead of gravity flow) and would be suitable for use with nonfluid lubricants. Such a modification of the Farmer device would require elimination of the cavity at the end of the piston near the outlet end of the Farmer device so that such end would be cavityless in disregard of and contrary to the teaching of Farmer.

ALTERNATIVE EMBODIMENTS

Figure 8:
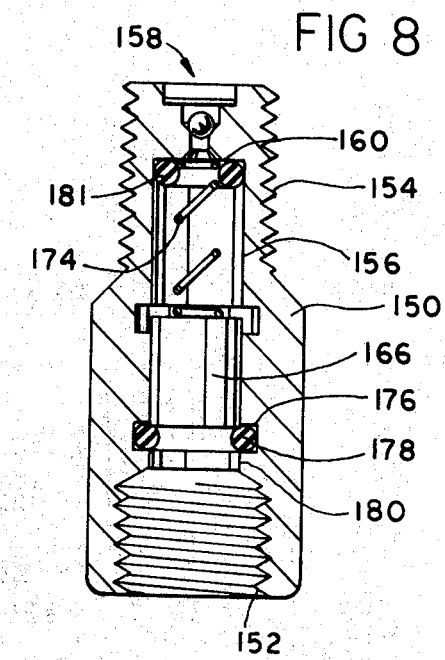
FIG. 8 is a view in vertical section of an alternative embodiment of a meter valve constructed according to my invention.
Figure 9:
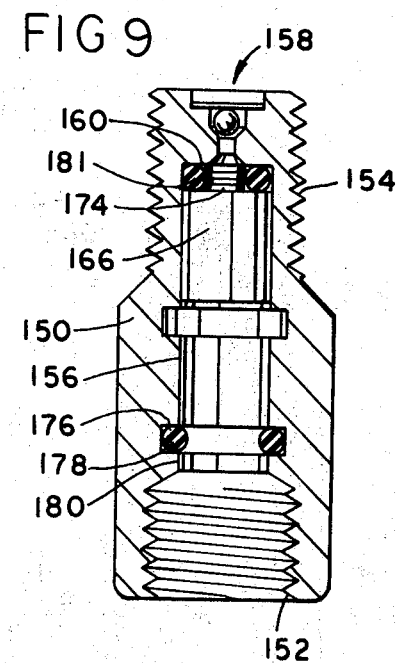
FIG. 9 is a view in vertical section of the meter valve shown in FIG. 8 with the spring in its compressed position.

In FIG. 8 and FIG. 9, I illustrate an alternative embodiment of my invention. For this embodiment, I have eliminated the plunger 68 shown in FIG. 4.

Similarly to the device of FIG. 4, the device of FIG. 8 has a body 150 with internal threads 152 at one end and external threads 154 at the other, and has a cylindrical bore 156. A ball check valve 158 is located at the outlet end 160 of the bore 156. A piston 166 is sealingly slidable within the bore 156. A spring 174 is provided to bias the piston 166. A grove 176 has an O-ring 178 located therein near the inlet end 180 of the bore 156 for the same sealing purpose already explained. An additional O-ring 181 is provided near the outlet end 160 to provide a seal to prevent lubricant leakage when the piston 166 is in the position shown in FIG. 9 and therefore serves the function served by the plunger in the embodiment of FIG. 4. The helical spring 174 is of a diameter which is sufficiently small to permit it to compress within the additional O-ring 181 at one end of the piston stroke as shown in FIG. 9.

The operation of the embodiment illustrated in FIG. 8 and FIG. 9 is the same as that of the embodiment of FIG. 4. However, because of the embodiment of FIGS. 8 and 9 which a has an O-ring 181 outlet seal rather than a plunger, the bore may be shorter and a greater compression ratio (or more accurately, a greater vacuum ratio) is obtainable.

Figure 10:
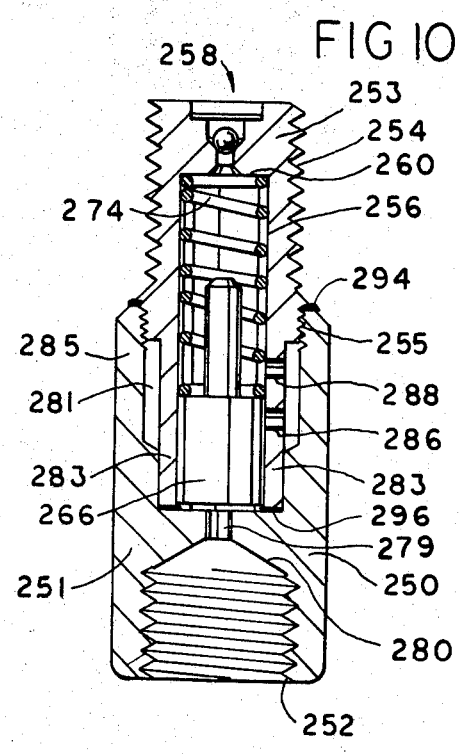
FIG. 10 is a view in vertical section of yet another alternative embodiment of a meter valve constructed according to my invention.
Figure 11:
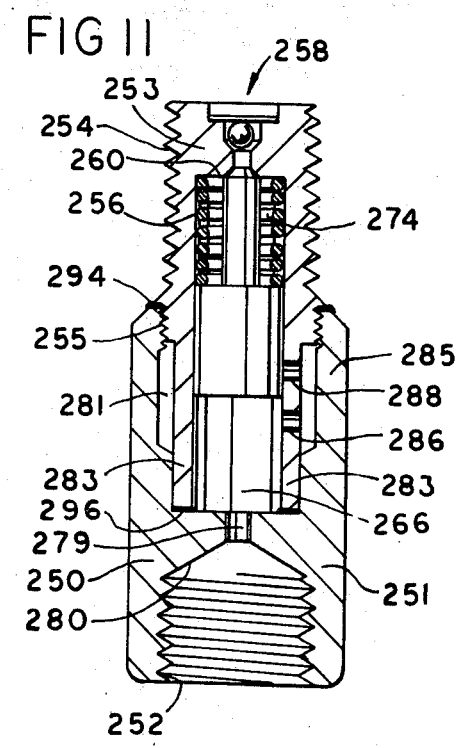
FIG. 11 is a view in vertical section of the meter valve shown in FIG. 10 with the spring in its compressed position.

In FIGS. 10 and 11, I show yet another embodiment of my invention. It is a body 250 which has threaded ends 252 and 254. The body 250 comprises two parts, an inlet part 251 and an outlet part 253, which are threadedly connected by cooperating threads 255. As in the other embodiments, the body 250 has a central bore 256 with a ball check valve 258 at its outlet end 260. A piston 266 slides within the bore 256 and is urged away from the outlet end by a spring 274. Lubricant may enter the bore through a passageway 279 at the inlet end 280 of the bore 256.

An annular compartment 281 surrounds the bore 256 and is formed between a narrow outside diameter sleeve portion 283 of the outlet part 253 and an inner wall 285 of the inlet part 251. A pair of ports 286 and 288 provide communication between the bore 256 and the compartment 281. I provide gaskets 294 and 296 for sealing purposes.

The operation of the embodiment of FIG. 10 and FIG. 11 begins with the piston 266 in the position shown in FIG. 10. In this position, the piston blocks communication between the port 286 and the inlet end 280 of the bore 256. Application of pressure on the lubricant forces the piston 266 toward the outlet end 260. The port 288 becomes blocked by the piston 266 and then the port 286 becomes unblocked and lubricant is forced into the compartment 281 and the piston assumes the position shown in FIG. 11.

When lubricant pressure is relaxed, the spring 274 urges the piston 266 away from the outlet end 260. A vacuum is created and when the port 288 is unblocked, lubricant boils out of the compartment 281, through the port 288, and into the bore 256.

Successive cycles cause ejection of a metered flow of lubricant through the ball valve 258 as described above.

Figure 12:
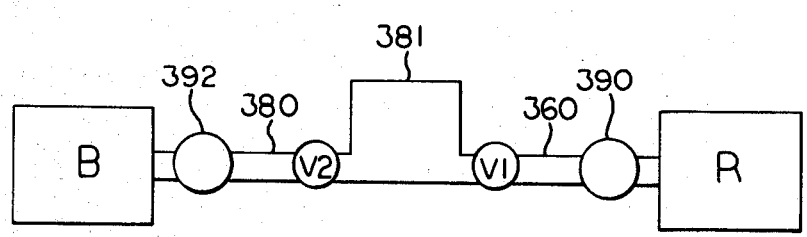
FIG. 12 is a diagrammatical view of the essential components of my invention.

In FIG. 12, I show a diagram which includes the essential components of my invention together with their cooperating apparatus. The essential components comprise a compartment 381 formed in a body. The compartment 381 is provided with means V1 and V2 for alternately blocking an inlet passage 360 and an outlet passage 380. By using the word "alternatively" when describing the means for alternatively blocking the passages, I mean that whenever one passage is open, the other is blocked during the intended operation of my device.

My invention also requires means 390 for forcing the lubricant into the compartment 381 and means 392 for substantially decreasing pressure on the compartment 381.

It is to be understood that while the detailed drawings and specific examples given describe preferred embodiments of my invention, they are for the purposes of illustration only, that the apparatus of the invention is not limited to the precise details and conditions disclosed, and that various changes may be made therein without departing from the spirit of the invention which is defined by the following claims.

I claim:

1. An improved lubrication metering device of the type having:
   a. a body with a cylindrical bore therein, the bore having an inlet end and an outlet end, the bore having a circular groove therein intermediate its ends;
   b. a cavityless imperforate piston sealingly slidable in the bore positioned alternatively,
      1. to block communication between the inlet end and the groove while permitting communication between the outlet end and the groove, and
      2. to block communication between the outlet end and the grove while permitting communication between the groove and the inlet end; and
   c. a check valve at the outlet end; whereby a substantial vacuum may be created at the outlet end of the bore for closing the check valve and for causing a lubricant in the groove to boil and whereby movement of the lubricant from the groove is thereby enhanced.

2. A metering unit suitable for nonfree flowing lubricants comprising:
   a. a body having a bore therein, the bore including a piston cylinder, the body having an annular groove in said cylinder intermediate the ends of the cylinder, the body also having an inlet communicating with one end of the cylinder and an outlet communicating with the other end;
   b. a substantially cavityless, imperforate piston sealingly slidable in the cylinder, the piston being alternatively positionable (1) to block communication between the groove and the inlet while permitting communication between the groove and the outlet, and (2) to block communication between the groove and the outlet while permitting communication between the groove and the inlet;
   c. a check valve at the outlet permitting flow of the body; and
   d. resilient means urging the piston away from the outlet and thereby closing the check valve wherein a substantial vacuum may be created at the outlet end of the cylinder for causing nonfree flowing lubricant to boil out of the groove into the outlet end of the cylinder.

75